US012602851B1

(12) United States Patent
Qi et al.

(10) Patent No.: US 12,602,851 B1
(45) Date of Patent: Apr. 14, 2026

(54) SYSTEMS FOR INCORPORATING OBJECTS INTO BACKGROUND IMAGES

(71) Applicant: AMAZON TECHNOLOGIES, INC., Seattle, WA (US)

(72) Inventors: Daiqing Qi, Palo Alto, CA (US); Shwetha Ram, Sunnyvale, CA (US); Han Ding, Redmond, WA (US); Rui Meng, El Cerrito, CA (US); Changyou Chen, Buffalo, NY (US); Tal Neiman, Brooklyn, NY (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 231 days.

(21) Appl. No.: 18/538,711

(22) Filed: Dec. 13, 2023

(51) Int. Cl.
  *G06T 11/60* (2006.01)
  *G06T 5/70* (2024.01)
  *H04N 5/272* (2006.01)

(52) U.S. Cl.
  CPC ................ *G06T 11/60* (2013.01); *G06T 5/70* (2024.01); *H04N 5/272* (2013.01)

(58) Field of Classification Search
  CPC ............ G06T 11/60; G06T 5/70; H04N 5/272
  See application file for complete search history.

(56) References Cited

U.S. PATENT DOCUMENTS

2024/0135610 A1* 4/2024 Kolkin ...................... G06T 5/70

OTHER PUBLICATIONS

Brooks, et al., "InstructPix2Pix: Learning to Follow Image Editing Instructions", University of California, Berkeley, Jan. 18, 2023, 15 pgs. Retrieved from the Internet: URL: https://arxiv.org/pdf/2211.09800.pdf.
Choi, et al., "StarGAN: Unified Generative Adversarial Networks for Multi-Domain Image-to-Image Translation", Sep. 21, 2018, 15 pgs. Retrieved from the Internet: URL: https://arxiv.org/pdf/1711.09020.pdf.
Couairon, et al., "DiffEdit: Diffusion-Based Semantic Image Editing with Mask Guidance", Oct. 20, 2022, 21 pgs. Retrieved from the Internet: URL: https://arxiv.org/pdf/2210.11427.pdf.
Dhariwal, et al., "Diffusion Models Beat GANs on Image Synthesis", OpenAI, Jun. 1, 2021, 44 pgs. Retrieved from the Internet: URL: https://arxiv.org/pdf/2105.05233.pdf.

(Continued)

*Primary Examiner* — Said Broome
*Assistant Examiner* — Andrew Shin
(74) *Attorney, Agent, or Firm* — Lindauer Law, PLLC

(57) ABSTRACT

A diffusion model receives as inputs an image of a background, first text describing the background, and second text describing an object to be added to the background. Using these inputs, the diffusion model generates an output image depicting the object within the background. To improve fidelity to the background image, the diffusion model uses the inputs associated with the background and the input associated with the object as separate conditions and determines a weight parameter that controls the probability of characteristics of each input occurring in the output image. Noise is added to the background image to create an initial image for the diffusion model. The first text and the second text are both used, in conjunction with the weight parameter, to determine a prompt to cause the diffusion model to generate an image of the object included in the background, while retaining the characteristics of the background image.

20 Claims, 4 Drawing Sheets

(56) References Cited

OTHER PUBLICATIONS

Du, et al., "Compositional Visual Generation with Energy Based Models", Dec. 17, 2020, 15 pgs. Retrieved from the Internet: URL: https://arxiv.org/pdf/2004.06030.pdf.

Du, et al., "Implicit Generation and Modeling with Energy-Based Models", Jun. 30, 2020, 21 pgs. Retrieved from the Internet: URL: https://arxiv.org/pdf/1903.08689.pdf.

Du, et al., "Improved Contrastive Divergence Training of Energy-Based Model", MIT CSAIL Google Brain, Jun. 11, 2021, 16 pgs. Retrieved from the Internet: URL: https://arxiv.org/pdf/2012.01316.pdf.

Gal, et al., "StyleGAN-NADA: CLIP-Guided Domain Adaptation of Image Generators", Dec. 16, 2021, 25 pgs. Retrieved from the Internet: URL: https://arxiv.org/pdf/2108.00946.pdf.

Grathwol, et al., "Learning the Stein Discrepancy for Training and Evaluating Energy-Based Models without Sampling", University of Toronto and Vector Institute, Aug. 14, 2020, 16 pgs. Retrieved from the Internet: URL: https://arxiv.org/pdf/2002.05616.pdf.

Hertz, et al., "Prompt-to-Prompt Image Editing with Cross Attention Control", Aug. 2, 2022, 19 pgs. Retrieved from the Internet: URL: https://arxiv.org/pdf/2208.01626.pdf.

Ho, et al., "Classifier-free Diffusion Guidance", Google Research, Brain team, Jul. 26, 2022, 14 pgs. Retrieved from the Internet: URL: https://arxiv.org/pdf/2207.12598.pdf.

Ho, et al., "Denoising Diffusion Probabilistic Models", UC Berkeley, Dec. 16, 2020, 25 pgs. Retrieved from the Internet: URL: https://arxiv.org/pdf/2006.11239.pdf.

Huang, et al., "Multimodal Unsupervised Image-to-Image Translation", Aug. 14, 2018, 23 pgs. Retrieved from the Internet: URL: https://arxiv.org/pdf/1804.04732.pdf.

Isola, et al., "Image-to-Image Translation with Conditional Adversarial Networks", Berkeley AI Research Laboratory, UC Berkeley, Nov. 26, 2018, 17 pgs. Retrieved from the Internet: URL: https://arxiv.org/pdf/1611.07004.pdf.

Jia, et al., "Taming Encoder for Zero Fine-tuning Image Customization with Text-to-Image Diffusion Models", Google, Apr. 5, 2023, 10 pgs. Retrieved from the Internet: URL: https://arxiv.org/pdf/2304.02642.pdf.

Kawar, et al., "Imagic: Text-Based Real Image Editing with Diffusion Models", Mar. 20, 2023, 16 pgs. Retrieved from the Internet: URL: https://arxiv.org/pdf/2210.09276.pdf.

Kim, et al., "Learning to Discover Cross-Domain Relations with Generative Adversarial Networks", SK T-Brain, May 15, 2017, 10 pgs. Retrieved from the Internet: URL: https://arxiv.org/pdf/1703.05192.pdf.

Kingma, et al., "Adam: A Method for Stochastic Optimization", Jan. 30, 2017, 15 pgs. Retrieved from the Internet: URL: https://arxiv.org/pdf/1412.6980.pdf.

Li, et al., "BLIP-Diffusion: Pre-trained Subject Representation for Controllable Text-to-Image Generation and Editing", Salesforce AI Research, Jun. 22, 2023, 22 pgs. Retrieved from the Internet: URL: https://arxiv.org/pdf/2305.14720.pdf.

Liew, et al., "MagicMix: Semantic Mixing with Diffusion Models", ByteDance Inc., Oct. 28, 2022, 16 pgs. Retrieved from the Internet: URL: https://arxiv.org/pdf/2210.16056.pdf.

Liu, et al., "Compositional Visual Generation with Composable Diffusion Models", Jan. 17, 2023, 30 pgs. Retrieved from the Internet: URL: https://arxiv.org/pdf/2206.01714.pdf.

Liu, et al., "Pseudo Numerical Methods for Diffusion Models on Manifolds", Zhejiang University, Oct. 31, 2022, 24 pgs. Retrieved from the Internet: URL: https://arxiv.org/pdf/2202.09778.pdf.

Mokady, et al., "Null-text Inversion for Editing Real Images using Guided Diffusion Models", Nov. 17, 2022, 20 pgs. Retrieved from the Internet: URL: https://arxiv.org/pdf/2211.09794.pdf.

Nijkamp, et al., "On the Anatomy of MCMC-Based Maximum Likelihood Learning of Energy-Based Models", UCLA Department of Statistics, Nov. 27, 2019, 9 pgs. Retrieved from the Internet: URL: https://arxiv.org/pdf/1903.12370.pdf.

Patashnik, et al., "StyleCLIP: Text-Driven Manipulation of StyleGAN Imagery", Mar. 13, 2021, 18 pgs. Retrieved from the Internet: URL: https://arxiv.org/pdf/2103.17249.pdf.

Rombach, et al., "High-Resolution Image Synthesis with Latent Diffusion Models", Apr. 13, 2022, 45 pgs. Retrieved from the Internet: URL: https://arxiv.org/pdf/2112.10752.pdf.

Sohl-Dickstein, et al., "Deep Unsupervised Learning using Nonequilibrium Thermodynamics", Nov. 18, 2015, 18 pgs. Retrieved from the Internet: URL: https://arxiv.org/pdf/1503.03585.pdf.

Song, et al., "Denoising Diffusion Implicit Models", Stanford University, Oct. 5, 2022, 22 pgs. Retrieved from the Internet: URL: https://arxiv.org/pdf/2010.02502.pdf.

Valevski, et al., "UniTune: Text-Driven Image Editing by Fine Tuning a Diffusion Model on a Single Image", Google Research, Jul. 5, 2023, 16 pgs. Retrieved from the Internet: URL: https://arxiv.org/pdf/2210.09477.pdf.

Wallace, et al., "EDICT: Exact Diffusion Inversion via Coupled Transformations", Salesforce Research, Dec. 22, 2022, 24 pgs. Retrieved from the Internet: URL: https://arxiv.org/pdf/2211.12446.pdf.

Wang, et al., "High-Resolution Image Synthesis and Semantic Manipulation with Conditional GANs", Aug. 20, 2018, 14 pgs. Retrieved from the Internet: URL: https://arxiv.org/pdf/1711.11585.pdf.

Wang, et al., "MDP: A Generalized Framework for Text-Guided Image Editing by Manipulating the Diffusion Path", KAUST, Mar. 30, 2023, 27 pgs. Retrieved from the Internet: URL: https://arxiv.org/pdf/2303.16765.pdf.

Wu, et al., "Uncovering the Disentanglement Capability in Text-to-Image Diffusion Models", Dec. 16, 2022, 23 pgs. Retrieved from the Internet: URL: https://arxiv.org/pdf/2212.08698.pdf.

Zhang, et al., "Adding Conditional Control to Text-to-Image Diffusion Models", Stanford University, Sep. 2, 2023, 12 pgs. Retrieved from the Internet: URL: https://arxiv.org/pdf/2302.05543.pdf.

Zhu, et al., "Unpaired Image-to-Image Translation using Cycle-Consistent Adversarial Networks", Berkeley AI Reasearch (BAIR) Laboratory, UC Berkeley, Aug. 24, 2020, 18 pgs. Retrieved from the Internet: URL: https://arxiv.org/pdf/1703.10593.pdf.

* cited by examiner

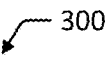

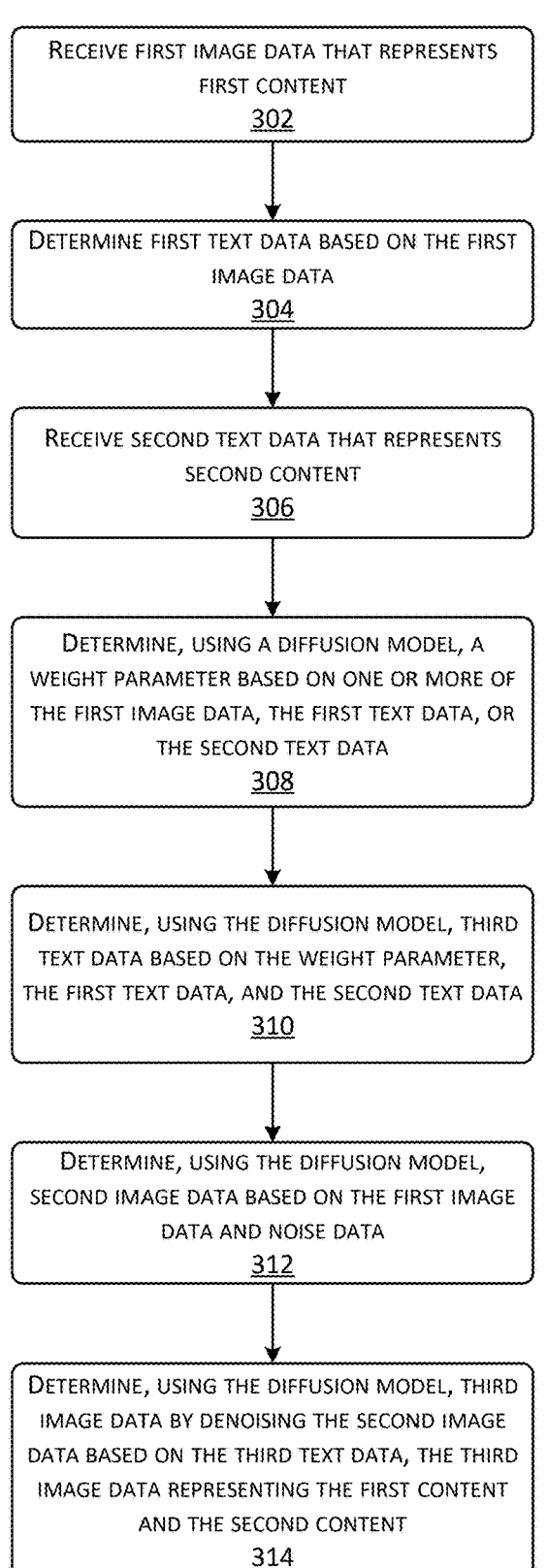

RECEIVE FIRST IMAGE DATA THAT REPRESENTS
FIRST CONTENT
302

DETERMINE FIRST TEXT DATA BASED ON THE FIRST
IMAGE DATA
304

RECEIVE SECOND TEXT DATA THAT REPRESENTS
SECOND CONTENT
306

DETERMINE, USING A DIFFUSION MODEL, A
WEIGHT PARAMETER BASED ON ONE OR MORE OF
THE FIRST IMAGE DATA, THE FIRST TEXT DATA, OR
THE SECOND TEXT DATA
308

DETERMINE, USING THE DIFFUSION MODEL, THIRD
TEXT DATA BASED ON THE WEIGHT PARAMETER,
THE FIRST TEXT DATA, AND THE SECOND TEXT DATA
310

DETERMINE, USING THE DIFFUSION MODEL,
SECOND IMAGE DATA BASED ON THE FIRST IMAGE
DATA AND NOISE DATA
312

DETERMINE, USING THE DIFFUSION MODEL, THIRD
IMAGE DATA BY DENOISING THE SECOND IMAGE
DATA BASED ON THE THIRD TEXT DATA, THE THIRD
IMAGE DATA REPRESENTING THE FIRST CONTENT
AND THE SECOND CONTENT
314

FIG. 3

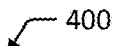

400

COMPUTING DEVICE(S)
402

POWER SUPPLY
404

COMMUNICATION
INTERFACE(S) 410

I/O DEVICE(S) 416

PROCESSOR(S)
406

I/O INTERFACE(S)
412

CLOCK(S)
408

NETWORK
INTERFACE(S) 414

MEMORY 418

OPERATING SYSTEM MODULE
420

DATA STORE 422

COMMUNICATION MODULE
424

VALUE DATA 208

INPUT IMAGE 106

IMAGE ANALYSIS MODULE
108

FIRST TEXT INPUT 110

WEIGHT LEARNING MODULE
114

SECOND TEXT INPUT 112

WEIGHT PARAMETER(S) 116

INPUT GENERATION MODULE
118

THIRD TEXT INPUT 120

NOISE GENERATION MODULE
122

OUTPUT IMAGE(S) 104

IMAGE GENERATION MODULE
126

OTHER DATA 428

OTHER MODULE(S)
426

FIG. 4

SYSTEMS FOR INCORPORATING OBJECTS INTO BACKGROUND IMAGES

BACKGROUND

Various types of machine learning models, such as text-to-image diffusion models, may be used to produce images based on text. However, in some cases, use of such models to edit an existing image, such as by adding an object to the image, may result in distortions and other errors.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

FIG. 3 is a diagram depicting an implementation of a method for using a diffusion model and two inputs to generate an output image.

FIG. 4 is a block diagram depicting an implementation of a computing device within the present disclosure.

Figure 1:
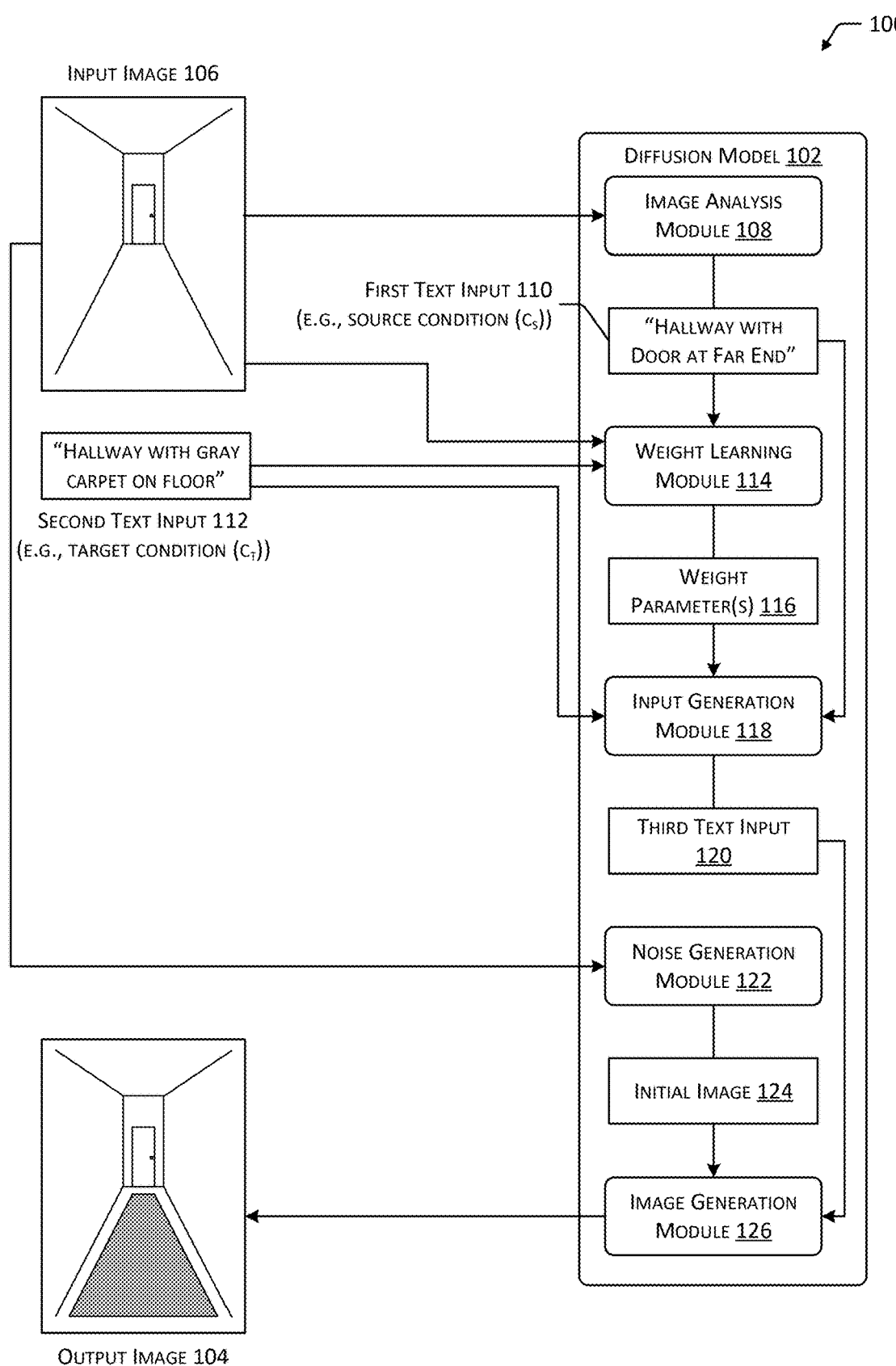
FIG. 1 is a diagram depicting an implementation of a system for using two inputs provided to a diffusion model to generate an output image.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Machine learning models may be used to generate images based on various types of inputs. For example, a diffusion model may be trained to generate an image based on text. Continuing the example, text that is descriptive of an object, scene, other type of image, or characteristics of an image may be provided to the diffusion model as an input, and the diffusion model may generate an image that corresponds to the descriptive text. Diffusion models generate the output image through a denoising process in which an initial image that includes sampled noise is iteratively modified in a series of denoising steps, with each step decreasing the amount of noise in the image to cause characteristics that correspond to the input text to be generated, until a final output image is generated. The quality of the final output image typically increases as a larger number of iterations are performed. Each denoising step performed using a diffusion model may be represented by Equation 1 below:

$$x_{t-1} = x_t - \epsilon_\theta(x_t, t) + \mathcal{N}(0, \sigma^2 I)$$

<div align="right">EQUATION 1</div>

In Equation 1, each image determined by the diffusion model is represented by X, with the denoising process beginning with an initial image $X_T$, sampled from noise, and ending with a final output image $X_0$, with a series of intermediate images $(X_T, X_{T-1}, \ldots, X_0)$ determined at each step of the denoising process. The denoising process for each timestep (t) may use a Gaussian distribution, represented as N, an identity matrix represented as I, and the predicted noise associated with a given timestep is represented as $\in_\theta(x_t, t)$.

Typically, a diffusion model receives a single input, such as a text prompt describing an image to be generated, then generates an image based on the text prompt through the denoising process represented by Equation 1. As a result, use of diffusion models may be unsuitable for performing certain types of editing processes for existing images. For example, to provide text describing an existing image and text describing an object to be added to the existing image to a diffusion model, a single input must be generated, such as by interpolating or otherwise combining the text. The resulting image generated by the diffusion model often lacks fidelity to the existing image, and may unsuccessfully incorporate the object to be added. In other implementations, cross attention layers may be added to a diffusion model, or an encoder that takes the concatenation of the two texts may be used, however use of these techniques requires training of groups of additional parameters.

Other types of machine learning models that may be used to generate images include Energy Based Models (EBMs), which are a form of generative model that learn a data distribution based on a sample dataset, then produce other datasets that match the data distribution. The data distribution of an EBM is modeled using an unnormalized probability density $(p_\theta)$ for a given image (x), that is related to an energy function $(E_\theta(x))$, which is a learnable neural network, as indicated in Equation 2 below:

$$p_\theta \propto e^{E_\theta(x)}$$

<div align="right">EQUATION 2</div>

The unnormalized probability distribution associated with the EBM is usable to sample from the unnormalized probability distribution to iteratively refine the generated image (x) through a series of timesteps (represented as $(X_0, \ldots, X_{T-1}, X_T)$, with $X_0$ representing an initial image and $X_T$ representing a final output image, as indicated in Equation 3 below:

$$x_t = x_{t-1} - \frac{\lambda}{2} \nabla_x E_\theta(x_{t-1}) + \mathcal{N}(0, \sigma^2 I)$$

<div align="right">EQUATION 3</div>

At each timestep, an EBM updates an image using the gradient of the energy function $(\nabla_x E_\theta(x_t) \propto \nabla_x \log p_\theta(x_t))$, with the EBM being trained so that the gradient of the energy function corresponds to a score associated with the data distribution. In a similar manner, a diffusion model updates an image at each timestep using a learned denoising network $(\in_\theta(x_t, t))$ that is trained to predict an underlying score of the data distribution.

Described in this disclosure are techniques for incorporating an object into an existing image using a diffusion model, such as a latent diffusion model, that generates an image based on multiple inputs, using principles found in EBMs that are adapted for use in text-guided image editing associated with diffusion models. As one example, first image data that represents an image, such as a background, first text data that is descriptive of the image, and second text data that is descriptive of an object to be added to the image, may be provided as inputs to a diffusion model that is trained to generate images based on text. In some implementations, the first text data that is descriptive of the image may be received as input. In other implementations, the first text data may be determined based on characteristics of the image, such as by using a machine learning model that is trained to determine text that corresponds to characteristics of images.

The first text data may represent a first input ($C_s$) to the diffusion model, while the second text data represents a second input ($C_t$) to the diffusion model. Because the learned denoising network ($\in_\theta(x_t, t)$) of a diffusion model is functionally similar to the gradient of the energy function ($\nabla_x E_\theta (x_t) \propto \nabla_x \log p_\theta(x_t)$) associated with an EBM, principles of compositional image generation associated with an EBM may be used in association with the diffusion model. For example, the conditional probability ($p(x|c_t,c_s)$) of the inclusion of characteristics of the first input ($C_s$) and the second input ($C_t$) to be included in an output image (x) may be represented by Equation 4 below:

$$p(x \mid c_t, c_s) = \frac{p(x)p(c_s \mid x)p(c_t \mid c_s, x)}{p(c_s, c_t)} \qquad \text{EQUATION 4}$$

In Equation 4, the expression $p(c_i|x)$ represents the probability of the output image (x) including characteristics of the input $c_i$, while the expression $p(c_t|c_s,x)$ represents the probability of the output image exhibiting characteristics of the input $c_t$, given the input $c_s$. Equation 4 may be used to represent the conditional probability of the output image exhibiting characteristics of particular inputs due to the assumption that the inputs $c_t$ and $c_s$ are related and are not independent of one another. For example, an EBM that assumes the independence of multiple conditions ($c_1, \ldots, c_n$) would instead factorize the conditional probability (p) of an output image (x) based on Equation 5:

$$p(x \mid c_1, \ldots, c_n) \propto p(x, c_1, \ldots, c_n) = p(x)\sum_{t=1}^{n} p(c_t \mid x) \qquad \text{EQUATION 5}$$

As such, the expression $p(c_i|x)$ in Equation 4 may be represented with a combination of a conditional distribution $p(x|c_i)$ and an unconditional distribution $p(x)$, which may be parameterized as diffusion models ($p(c_i|x)) \propto (p(x|c_i)p(x))$, as illustrated in Equation 6 below:

$$p(x \mid c_t, c_s) \propto p(x) \cdot w_1 \left( \frac{p(x \mid c_s)}{p(x)} \right) \cdot w_2(p(c_t \mid c_s, x)) \qquad \text{EQUATION 6}$$

In Equation 6, $w_1$ and $w_2$ are learnable coefficients (e.g., weight factors). Because $p(c_t|c_s,x)$ may further be decomposed as $(p(c_t,c_s,x)/p(c_s,x) \propto (p(x|c_t,c_s)/p(c_s,x))$, the derivative of the log probability of Equation 4 may be expressed based on the gradients of the energy function of an EBM, as indicated in Equation 7 below:

$$\nabla_x \log(p(x|c_t,c_s)) = \nabla_x \log(p(x)) + w_1(\nabla_x \log(p(x|c_s)) - \nabla_x \log(p(x))) + w_2(\nabla_x \log(p(x|c_t,c_s)) - \nabla_x \log(p(x,c_s))) \qquad \text{EQUATION 7}$$

As described previously, the gradient of the energy function of an EBM may be considered to be functionally similar to the learned denoising network of a diffusion model. Therefore, the derivatives of the log probability, which are proportional to the gradients of the energy function, in Equation 7 may be replaced with the score functions of the diffusion model, as indicated in Equation 8 below:

$$\in_\theta(x,c_t,c_s) = \in_\theta(x) + w_1(\in_\theta(x,c_s) - \in(x)) + w_2(\in_\theta(x,c_t,c_s) - \in_\theta(x,c_s)) \qquad \text{EQUATION 8}$$

As described previously, a diffusion model used for text-guided image generation is typically trained to generate an output image based on a single text input, such as a vector embedding. For example, the expression $\in_\theta(x,c_t,c_s)$ that relies on multiple inputs may not be suitable for use with a diffusion model. Therefore, after receiving the first text data and the second text data as inputs, in some implementations, the diffusion model may determine third text data (e.g., a single input) based on the first text data, the second text data, and a weight parameter ($\lambda$) that affects the probability of inclusion of characteristics of the first text data or the second text data in the output image. For example, the third text data may include a weighted average of the first text data and the second text data, with the weight determined based on the weight parameter. Continuing the example, the expression $\in_\theta(x,c_t,c_s)$ may be weighted using the weight parameter ($\lambda$) to determine the weighted expression $\in_\theta(x,\lambda c_t + (1-\lambda)c_s)$, which may constitute a single input for the diffusion model that may function similarly to the expression $\nabla_x \log (p(x|c_t, c_s))$ in Equation 7, above.

Use of the weight parameter to determine a weighted average based on the first text data and the second text data may be performed without requiring training or fine-tuning operations for the diffusion model, such as when adding cross-attention or encoder layers to the model. In some implementations, the weight parameter may be learned by the diffusion model through generation of a series of output images. For example, an initial value for the weight parameter, such as 0.5, may be set, a weighted average for input to the diffusion model may be determined using this initial value, the first text data, and the second text data, and an output image may be determined. A loss value may be calculated based on the output image and the image associated with the first text data, and based on the loss value, the weight parameter may be modified. In some cases, this process may be performed multiple times, such as a fixed number of times, or until the loss value is less than a threshold value. For example, a directional CLIP loss value may be determined, and an optimal value for the weight parameter that minimizes the loss value may be determined based on Equation 9 below:

$$\min_{\{\lambda^t, w_1^t, w_2^t\}_{t=1}^T} \mathcal{L}_{d-clip}\left(x_0^{(0)}, x_0^{(\lambda)}, c_s, c_t\right) + \mathcal{L}_{clip}\left(x_0^{(0)}, x_0^{(\lambda)}, c_s, c_t\right) + \alpha \mathcal{L}_{pres}\left(x_0^{(0)}, x_0^{(\lambda)}\right) \qquad \text{EQUATION 9}$$

In some implementations, the weight parameter may be a time-dependent parameter that may change based on the timestep (e.g., number of iterations performed) associated with the diffusion model. For example, during earlier timesteps, the weight parameter may prioritize inclusion of characteristics associated with the first text data to cause the output image to have fidelity with respect to the first image data described by the first text data, while at later timesteps, the weight parameter may prioritize inclusion of characteristics associated with the second text data to cause inclusion of the object described by the second text data in the output image. As another example, if the image described by the first text data is complex, the weight parameter may prioritize inclusion of characteristics associated with the first text data to increase fidelity to the complex characteristics of the first image data. If the image object described by the second text data is complex, the weight parameter may prioritize inclusion of characteristics associated with the second text data to increase the inclusion of the object in the output image.

To determine an output image based on the third text data (e.g., a single input, such as a vector embedding, determined based on the weight parameter, the first text data, and the second data), the diffusion model may determine second image data based on the first image data and generated noise. For example, the first image data may represent an image of a background, the first text data may include text descriptive of the image, and the second text data may include text descriptive of an object to be added to the image. Second image data may be generated by adding noise, such as Gaussian noise, to the first image, to create an initial image for use with the diffusion model. Because the noise vector used to generate the second image data is known, if the second image data were denoised using the diffusion model and the first text data as an input, the output image would correspond to the first image data. However, after generating the second image data, the diffusion model is then used to determine an output image based on the third text data, which includes a weighted average of the first text data and the second text data based on the weight parameter. The diffusion model may include a parameter that assumes dependency between the first text data and the second text data. For example, the probability of inclusion of features associated with the first text data and the second text data in the output image may be determined based on Equation 4. Additionally, as described previously, the weight parameter may change during the denoising process based on the timestep associated with the diffusion model. Therefore, third image data may be generated by the diffusion model, which denoises the second text data to determine the third image data, the third image data representing an output image that represents the object described in the second text data added to the background image described in the first text data. Use of both the first text data and the second text data to determine a weighted input to the diffusion model, processed as described herein, increases the probability that the output image will retain the characteristics of the first image data while also including the object described in the second text data.

FIG. 1 is a diagram 100 depicting an implementation of a system for using two inputs provided to a diffusion model 102 to generate an output image 104. The diffusion model 102 may be trained to generate images based on text. For example, text data that describes an object, scene, or other type of content may be provided to the diffusion model 102 as an input, and the diffusion model 102 may generate an output image 104 that corresponds to the descriptive text of the text input. In the implementation shown in FIG. 1, the diffusion model 102 may be used to perform a specific type of image editing, in which preexisting image data, such as an input image 106 depicting a background, may be edited by adding an object to the image described in a text input. For example, FIG. 1 depicts an input image 106 that depicts a hallway having a door. In some implementations, an image analysis module 108 associated with the diffusion model 102, or another machine learning model, may be used to determine a first text input 110 based on the input image 106. For example, because the diffusion model 102 is trained to generate an output image 104 based on text inputs, the first text input 110 may include text that is descriptive of the input image 106. Continuing the example, the image analysis module 108 may include a machine learning system that is trained to generate text based on one or more characteristics of an image. In the implementation shown in FIG. 1, the first text input 110 "Hallway with door at far end" is determined based on the input image 106, the text of the first text input 110 describing the depicted hallway presented in the input image 106.

In other implementations, the first text input 110 may be provided directly to the diffusion model 102, such as via user input, and use of an image analysis module 108 to determine the first text input 110 may be omitted. For example, the input image 106 may be provided in association with the first text input 110 as a caption or other descriptive text.

A second text input 112 may also be provided to the diffusion model 102. The second text input 112 may include text descriptive of an object, or another type of content or modification to be applied to the input image 106. For example, FIG. 1 depicts the second text input 112 as "Hallway with gray carpet on floor", which may be used to cause generation of an output image 104 that retains the characteristics of the input image 106 by depicting the hallway presented in the input image 106, but also adds characteristics described in the second text input 112, such as by including gray carpet in the depicted hallway. Conventional techniques for use of multiple text inputs with diffusion models typically include combining text inputs through concatenation, interpolation, or other methods. The resulting text input, when provided to diffusion models, may result in an image that does not properly incorporate the object specified in the second input or that distorts the features indicated in the first input without maintaining fidelity to an initial image.

In the implementation shown in FIG. 1, a weight learning module 114 associated with the diffusion model 102 may determine one or more weight parameters 116 based on the first text input 110, the second text input 112, and the input image 106. The weight parameter(s) may determine the probability of inclusion of characteristics of the first text input 110 or second text input 112 in the output image 104. For example, as described with regard to Equation 8 above, the expression $\in_{\theta}(x,c_t,c_s)$, which references multiple text inputs ($c_t$ and $c_s$) may be replaced with a single input based on the weight parameter 116, represented as $\in_{\theta}(x,\lambda c_t+(1-\lambda)c_s)$.

As described previously, in some implementations, the weight learning module 114 may set an initial value for the weight parameter 116 ($\lambda$) and determine an image based on the initial value, the first text input 110, and the second text input 112. A loss value based on the determined image and the input image 106 may be determined, as described with regard to Equation 9 above. Based on the loss value, the initial value may be modified to determine an updated weight parameter 116. This process may be repeated for a selected number of iterations, or until a selected condition is met, such as a loss value below a threshold, to determine a final weight parameter 116. In some implementations, the weight parameter 116 may be a time-dependent parameter that changes based on the timestep (e.g., number of iterations performed) associated with the diffusion model 102. For example, during earlier timesteps, the weight parameter 116 may prioritize inclusion of characteristics associated with the first text input 110 to retain fidelity in the output image 104 with respect to the input image 106. During later timesteps, the weight parameter 116 may prioritize inclusion of characteristics associated with the second text input 112 to cause inclusion of the object described by the second text input 112 in the output image 104. As another example, the weight parameter 116 may prioritize inclusion of characteristics of a particular input based on the complexity of the input. Continuing the example, text describing an object having a complex shape, texture, coloration, and so forth, or an object that is uncommon, may be prioritized to reduce the probability of omission of characteristics of the described object in the output image 104.

An input generation module 118 associated with the diffusion model 102 may determine a third text input 120 based on the first text input 110, the second text input 112, and the weight parameter 116. As described previously, the diffusion model 102 may be trained to determine an output image 104 based on a single input, rather than multiple inputs. The third text input 120 may include a vector embedding or other type of input that represents a weighted average based on the first text input 110 and the second text input 112, with the weight associated with each text input determined based on the weight parameter 116. For example, a weighted average based on the weight parameter 116 (represented by $\lambda$), the first text input 110 (represented by $c_s$), and the second text input 112 (represented by $c_t$) may be represented by the expression $\lambda c_t + (1-\lambda)c_s$.

A noise generation module 122 associated with the diffusion model 102 may generate an initial image 124, based on the input image 106, for performance of a denoising process using the diffusion model 102. For example, the noise generation module 122 may perform a reverse-diffusion process, or may otherwise add noise (such as Gaussian noise) to the input image 106 to produce an initial image 124 that is suitable for performance of a subsequent denoising process based on the third text input 120.

An image generation module 126 associated with the diffusion model 102 may generate an output image 104 based on the initial image 124 and the third text input 120. The diffusion model 102 may perform an iterative denoising process in which, at each timestep of a set of successive timesteps, the amount of noise in the preceding image is reduced in a manner based on the third text input 120. After a selected number of iterations or a selected condition has been met, sufficient noise may be removed from the initial image 124 to generate an output image 104 having characteristics based on the third text input 120. As described previously and indicated in Equation 4, the diffusion model 102 may generate the output image 104 based on the first text input 110 and second text input 112 being related rather than independent. For example, because the task associated with the diffusion model 102 includes generation of an output image 104 that retains the features of the input image 106 but also adds an object associated with the second text input 112, the features associated with the first text input 110 and second text input 112 may be assumed to be dependent on one another when denoising the initial image 124 to generate the output image 104. The diffusion model 102 may therefore include a parameter that assumes dependence of the text inputs. For example, the probability of inclusion of features associated with the first text input 110 or second text input 112 in the output image 104 may be determined based on Equation 4. Due to the third text input 120 being determined based on the first text input 110, the second text input 112, the weight parameter 116, and a parameter of the diffusion model 102 that indicates dependence between the first text input 110 and the second text input 112, the output image 104 may include characteristics indicated in both the first text input 110 and the second text input 112. For example, FIG. 1 depicts the output image 104 depicting the hallway shown in the input image 106, with the addition of a gray carpet specified in the second text input 112. As described previously, the weight parameter 116 may be a time-dependent parameter that prioritizes characteristics of the first text input 110 at selected timesteps to cause the output image 104 to retain characteristics of the input image 106, while prioritizing characteristics of the second text input 112 at selected timesteps to cause the output image 104 to include characteristics associated with the second text input 112.

Figure 2:
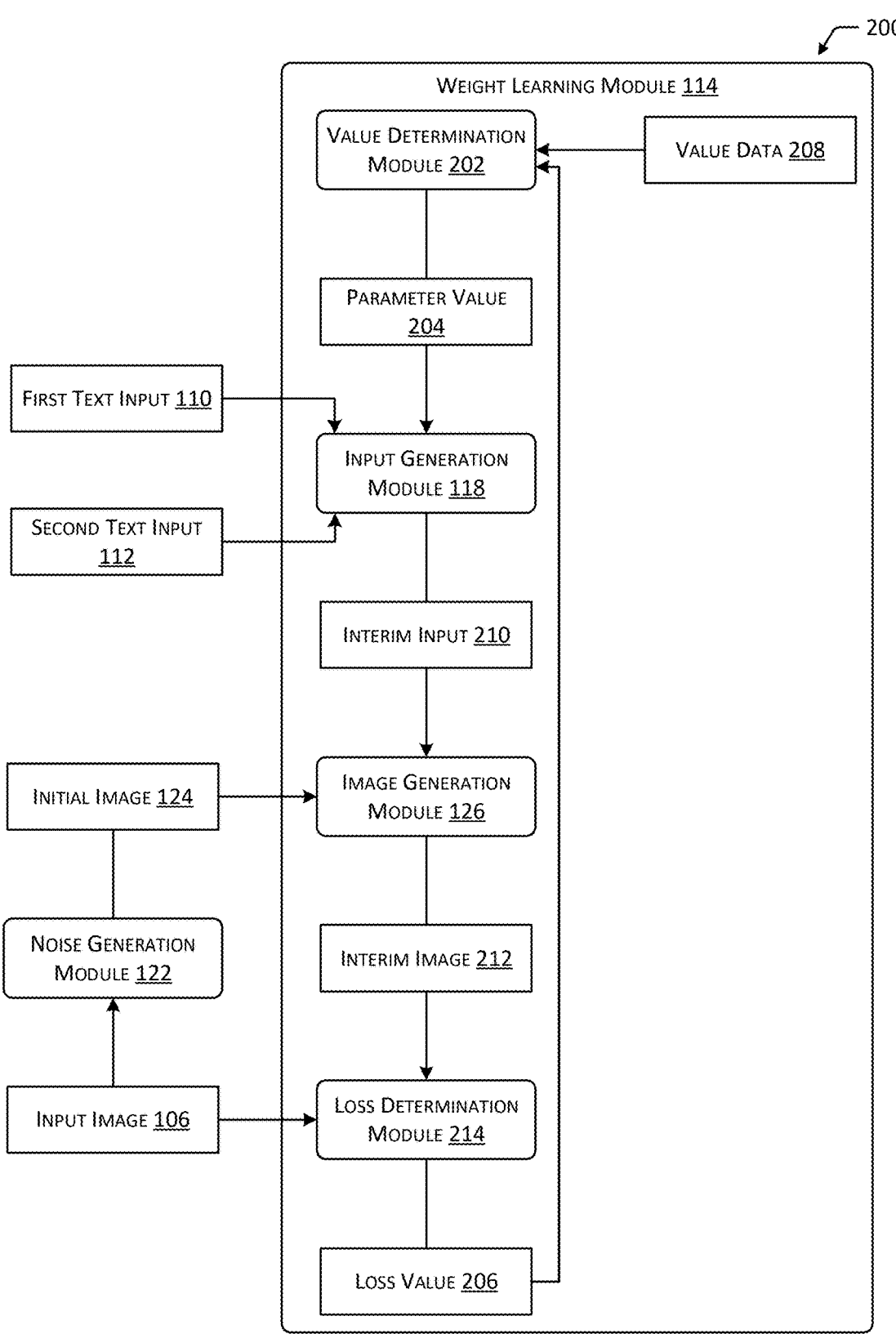
FIG. 2 is a diagram depicting an implementation of a system for determining weight parameters for generation of inputs to provide to a diffusion model.

FIG. 2 is a diagram 200 depicting an implementation of a system for determining weight parameters 116 for generation of inputs to provide to a diffusion model 102. As described with regard to FIG. 1, a first text input 110 and a second text input 112 may be provided as inputs to a diffusion model 102 for generation of an output image 104. However, the diffusion model 102 may be configured to use a single input rather than multiple inputs. Therefore, the diffusion model 102 may determine a third text input 120, such as an embedding or other type of input representing a weighted average of the first text input 110 and second text input 112, the weights associated with each input determined using a weight parameter 116. The weight parameter 116 may be learned by generating images based on values of the weight parameter 116, then modifying the weight parameter 116 to minimize loss relative to the input image 106. Additionally, in some implementations, the weight parameter 116 may be a time-dependent parameter that changes based on the timestep associated with the diffusion model 102, such as to prioritize inclusion of features associated with different inputs at different timesteps.

FIG. 2 depicts an implementation of the weight learning module 114, which may be used to determine the weight parameter 116 based on the first text input 110 and second text input 112. A value determination module 202 associated with the weight learning module 114 may determine an initial parameter value 204 for the weight parameter 116, or a modified parameter value 204 for the weight parameter 116. For example, when performing a first iteration, the value determination module 202 may set an initial parameter value 204 for the weight parameter 116, such as 0.5. When performing a subsequent iteration, the value determination module 202 may modify the value of the weight parameter 116 based on the current parameter value 204 and a loss value 206. In some implementations, the value determination module 202 may access value data 208, which may indicate initial values for the weight parameter 116, and one or more rules, algorithms, or relationships that may be used to modify a value of the weight parameter 116 based on a loss value 206.

The input generation module 118, or another module associated with the weight learning module 114, may determine an interim input 210 based on the first text input 110, the second text input 112, and the parameter value 204. The interim input 210 may function similarly to the third text input 120 described with regard to FIG. 1, however the interim input 210 weights the first text input 110 and the second text input 112 based on the determined parameter value 204 rather than the final determined value for the weight parameter 116.

The image generation module 126, or another module associated with the weight learning module 114, may determine an interim image 212 based on the interim input 210 and the initial image 124. For example, the image generation module 126 may perform a denoising process to iteratively generate the interim image 212 through a series of timesteps, by removing noise from the interim image 212 in a manner based on the interim input 210. For example, the interim image 212 may function similarly to the output image 104 described with regard to FIG. 1, however the interim image 212 is determined based on the interim input 210 rather than the third text input 120 that is determined using the final value for the weight parameter 116. In some implementations, a smaller number of iterations may be performed to determine the interim image 212 relative to the number of iterations performed to determine the final output image 104. As described with regard to FIG. 1, the initial image 124 may be determined by adding noise to the input image 106, such as through use of noise generated by the noise generation module 122.

A loss determination module 214 associated with the weight learning module 114 may determine a loss value based on the interim image 212 and the input image 106. The loss value 206 may be indicative of the characteristics of the input image 106 that are retained in the interim image 212. In some implementations, the loss value 206 may be determined based on Equation 9, described above.

As described previously, the loss value 206 may be used to determine a modifier for the parameter value 204, and the value determination module 202 may determine an updated parameter value 204 based on the current parameter value 204 and the loss value 206. In some implementations, the process described with regard to FIG. 2 may be performed for a selected number of iterations. In other implementations, the process described with regard to FIG. 2 may be performed until one or more conditions are met, such as determining a loss value 206 or a change in loss value 206 that is less than a threshold value.

FIG. 3 is a diagram 300 depicting an implementation of a method for using a diffusion model 102 and two inputs to generate an output image 104. At 302, first image data that represents first content may be received. For example, the first image data may include an input image 106, such as an image depicting a background, an object, or other types of content.

At 304, first text data may be determined based on the first image data. For example, the first text data may include text that is descriptive of one or more characteristics of the image represented by the first image data. In some implementations, the first text data may be received concurrently with the first image data and the first text data may be determined based on the received input. For example, the first text data may be stored in association with the first image data and determined based on the stored data. In other implementations, the first text data may be received separately from the first image data, such as via user input, and determined based on the user input. In still other implementations, the first text data may be determined based on characteristics of the first image data. For example, one or more machine learning models that are trained to generate text based on characteristics of images may process the first image data to determine the first text data.

At 306, second text data that represents second content may be received. For example, the second text data may include text that is descriptive of an object to be added to a background depicted in the image represented by the first image data. In some implementations, the second text data may be received via user input. In other implementations, the second text data may be determined based on the input of one or more other types of data. For example, audio data received as input may be processed using speech to text techniques to determine the second text data. As another example, images that are received as input may be processed using computer vision, optical character recognition, or other image processing techniques to determine the second text data.

At 308, a weight parameter 116 may be determined using a diffusion model 102 based on one or more of the first image data, the first text data, or the second text data. As described with regard to FIGS. 1-2, in some implementations, the weight parameter 116 may be determined by setting an initial value for the weight parameter 116, determining one or more interim images 212, determining a loss value 206 associated with each interim image 212, and modifying the weight parameter 116 based on the loss value(s) 206. The weight parameter 116 may determine the probability of an output image 104 determined using the diffusion model 102 to include characteristics of the first text data or the second text data.

At 310, third text data may be determined based on the weight parameter 116, the first text data, and the second text data. For example, the diffusion model 102 may be configured to determine output images 104 based on a single text input. Therefore, the weight parameter 116 may be used to determine a weighted combination of the first text data and the second text data. In some implementations, the weight parameter 116 may have different values based on the timestep (e.g., number of iterations performed) associated with the diffusion model 102. For example, during earlier timesteps, the weight parameter 116 may prioritize inclusion of characteristics associated with the first text data, while during later timesteps, the weight parameter 116 may prioritize inclusion of characteristics associated with the second text data.

At 312, the diffusion model 102 may be used to determine second image data based on the first image data and noise data. For example, the diffusion model 102 may be used to perform a reverse-diffusion process by adding noise to an input image 106 to determine an initial image 124 for use in a denoising process. In some implementations, the initial image 124 may include pure Gaussian noise, or other types or quantities of noise.

At 314, the diffusion model 102 may be used to determine third image data by denoising the second image data based on the third text data. As described previously and indicated in Equation 4, the denoising process through which the third image data is determined may account for relationships or dependencies between the first text data and second text data (e.g., the diffusion model 102 may include a parameter indicating that the text inputs are not independent of one another). The resulting third image data may represent an image that depicts the first content and the second content. For example, the third image data may include an output image 104 that retains characteristics of an input image 106 and includes an object having characteristics described in the second text data. Use of a conventional diffusion model to generate an image based on a prompt determined using two text inputs may not successfully retain characteristics of an input image while including an object described in text data. For example, concatenation of text inputs rather than determining a weight parameter 116 as described previously, or denoising of an initial image 124 while treating each text input as independent of one another may result in a generated image that includes distortions in the content of the input image, duplicate images of the object associated with the second text data, distortions of the object or background, disproportional sizes of the object, and so forth. Determination of third text data based on the first text data, second text data, and weight parameter 116 as described herein and use of an initial image 124 that is determined based on the input image 106 increases the probability that a generated output image 104 will retain the characteristics of the input image 106 while incorporating an object described in the second text data.

FIG. 4 is a block diagram 400 depicting an implementation of a computing device 402 within the present disclosure. The computing device 402 may include one or multiple computing devices that store data and control operations of the system show in FIGS. 1 and 2. For example, one or more computing devices 402 may store components of a diffusion model 102, one or more other machine learning models such as machine learning models associated with the image analysis module 108, and so forth. Thus, while FIG. 4 depicts a single block diagram 400, the computing device 402 may include any number and any type of computing devices including, without limitation, one or more servers, personal computing devices, portable computing devices, network-accessible data storage devices, and so forth.

One or more power supplies 404 may be configured to provide electrical power suitable for operating the components of the computing device 402. In some implementations, the power supply 404 may include a rechargeable battery, fuel cell, photovoltaic cell, power conditioning circuitry, and so forth.

The computing device 402 may include one or more hardware processor(s) 406 (processors) configured to execute one or more stored instructions. The processor(s) 406 may include one or more cores. One or more clock(s) 408 may provide information indicative of date, time, ticks, and so forth. For example, the processor(s) 406 may use data from the clock 408 to generate a timestamp, trigger a preprogrammed action, and so forth.

The computing device 402 may include one or more communication interfaces 410, such as input/output (I/O) interfaces 412, network interfaces 414, and so forth. The communication interfaces 410 may enable the computing device 402, or components of the computing device 402, to communicate with other computing devices 402 or components of the other computing devices 402. The I/O interfaces 412 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 412 may couple to one or more I/O devices 416. The I/O devices 416 may include any manner of input devices or output devices associated with the computing device 402. For example, I/O devices 416 may include touch sensors, displays, touch sensors integrated with displays (e.g., touchscreen displays), keyboards, mouse devices, microphones, image sensors, cameras, scanners, speakers or other types of audio output devices, haptic devices, printers, and so forth. In some implementations, the I/O devices 416 may be physically incorporated with the computing device 402. In other implementations, I/O devices 416 may be externally placed.

The network interfaces 414 may be configured to provide communications between the computing device 402 and other devices, such as the I/O devices 416, routers, access points, and so forth. The network interfaces 414 may include devices configured to couple to one or more networks including local area networks (LANs), wireless LAN (WLANs), wide area networks (WANs), wireless WANs, and so forth. For example, the network interfaces 414 may include devices compatible with Ethernet, Wi-Fi, Bluetooth, ZigBee, Z-Wave, 5G, LTE, and so forth.

The computing device 402 may include one or more buses or other internal communications hardware or software that allows for the transfer of data between the various modules and components of the computing device 402.

As shown in FIG. 4, the computing device 402 may include one or more memories 418. The memory 418 may include one or more computer-readable storage media (CRSM). The CRSM may be any one or more of an electronic storage medium, a magnetic storage medium, an optical storage medium, a quantum storage medium, a mechanical computer storage medium, and so forth. The memory 418 may provide storage of computer-readable instructions, data structures, program modules, and other data for the operation of the computing device 402. A few example modules are shown stored in the memory 418, although the same functionality may alternatively be implemented in hardware, firmware, or as a system on a chip (SoC).

The memory 418 may include one or more operating system (OS) modules 420. The OS module 420 may be configured to manage hardware resource devices such as the I/O interfaces 412, the network interfaces 414, the I/O devices 416, and to provide various services to applications or modules executing on the processors 406. The OS module 420 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Washington, USA; or other operating systems.

One or more data stores 422 and one or more of the following modules may also be associated with the memory 418. The modules may be executed as foreground applications, background tasks, daemons, and so forth. The data store(s) 422 may use a flat file, database, linked list, tree, executable code, script, or other data structure to store information. In some implementations, the data store(s) 422 or a portion of the data store(s) 422 may be distributed across one or more other devices including other computing devices 402, network attached storage devices, and so forth.

A communication module 424 may be configured to establish communications with one or more other computing devices 402. Communications may be authenticated, encrypted, and so forth.

The memory 418 may additionally store the image analysis module 108. The image analysis module 108 may determine text data based on a received input image 106. In some implementations, the image analysis module 108 may include a machine learning system that is trained to generate text based on an image. In other implementations, text associated with an input image 106 may be received via user input, and use of an image analysis module 108 to determine text may be omitted.

The memory 418 may store the weight learning module 114. The weight learning module 114 may determine one or more weight parameters 116 based on one or more text inputs, and in some cases based on an input image 106. The weight parameter(s) 116 may control the probability of inclusion of characteristics associated with different inputs in an output image 104. In some implementations, the weight learning module 114 may set an initial value for the weight parameter 116 and determine an image based on the initial value and multiple text inputs. A loss value 206 based on the determined image may be determined, as described with regard to Equation 9 above. Based on the loss value 206, the initial value may be modified to determine an updated weight parameter 116. This process may be repeated for a selected number of iterations, or until a selected condition is met, such as a loss value 206 below a threshold, to determine a final weight parameter 116. In some implementations, the determined weight parameter 116 may change based on the timestep (e.g., number of iterations performed) associated with the diffusion model 102.

The memory 418 may also store the input generation module 118. The input generation module 118 may determine a single input based on multiple inputs and the weight parameter 116 determined using the weight learning module 114. For example, the diffusion model 102 may be trained to determine an output image 104 based on a single input, rather than multiple inputs. The determined single input may include a weighted input based on the weight parameter 116 that controls the probability of inclusion of characteristics of the first input or the second input in an output image 104.

The memory 418 may additionally store the noise generation module 122. The noise generation module 112 may generate an initial image 124 for use with a denoising process of a diffusion model 102. The initial image 124 may be generated by adding noise to an input image 106.

The memory 418 may store the image generation module 126. The image generation module 126 may generate an output image 104 based on an initial image 124 determined using the noise generation module 122, and an input determined using the input generation module 118. The image generation module 126 may perform an iterative denoising process in which, at each timestep of a set of successive timesteps, the amount of noise in the preceding image is reduced in a manner based on the single input. As indicated in Equation 4, the denoising process may be performed assuming the non-independence of multiple text inputs. After a selected number of iterations or a selected condition has been met, sufficient noise may be removed from the initial image 124 to generate an output image 104 having characteristics based on the single input. Because the single input is determined based on multiple initial inputs and the weight parameter 116, the output image 104 may include characteristics indicated in both of the inputs.

Other modules 426 may also be present in the memory 418. For example, other modules 426 may include permission or authorization modules for modifying data associated with the computing device 402. Other modules 426 may also include encryption modules to encrypt and decrypt communications between computing devices 402, authentication modules to authenticate communications sent or received by computing devices 402, and so forth. Other modules 426 may include modules for training the diffusion model 102 or other machine learning models. Other modules 426 may also include modules for analyzing or processing text data, for generating text data based on audio data, video data, image data, or other types of data, and so forth. Other modules 426 may additionally include user interface modules for receiving user input, such as input images 106, text inputs, and so forth, and providing output such as output images 104 via one or more user interfaces.

Other data 428 within the data store(s) 422 may include configurations, settings, preferences, and default or threshold values associated with computing devices 402, style or layout data for generation of interfaces, and so forth. Other data 428 may include training data for training the diffusion model 102 and other machine learning models. Other data 428 may also include encryption keys and schema, access credentials, and so forth.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more non-transitory memories storing computer-executable instructions; and
one or more hardware processors to execute the computer-executable instructions to:
receive user input associated with first image data;

determine one or more characteristics associated with the first image data;

determine first text data based on the one or more characteristics associated with the first image data, wherein the first image data represents first content;

determine second text data that represents second content;

provide the first text data and the second text data as inputs to a machine learning model that is trained to generate image data based on text data associated with one or more inputs that are dependent;

determine, using the machine learning model, second image data based on noise data and one or more of the first text data or the first image data;

determine, using the machine learning model, a weight parameter associated with one or more of the first text data or the second text data; and determine, using the machine learning model, third image data based on the second image data, the weight parameter, the first text data, the second text data, and a parameter indicative of dependence between the first text data and the second text data.

2. The system of claim 1, further comprising computer-executable instructions to:

determine the second text data based on the user input.

3. The system of claim 1, further comprising computer-executable instructions to:

determine third text data based on the weight parameter, the first text data, and the second text data;

wherein the machine learning model determines the third image data based on the third text data.

4. The system of claim 1, wherein the computer-executable instructions to determine the weight parameter include computer-executable instructions to, using the machine learning model:

determine an initial value for the weight parameter;

determine fourth image data based on the initial value, the first text data, and the second text data;

determine a loss value based on the fourth image data and one or more of the first image data or the first text data; and modify the initial value based on the loss value to determine the weight parameter.

5. The system of claim 1, wherein the machine learning model is a diffusion model that generates the second image data by adding noise to the first image data and generates the third image data by denoising the second image data based on the weight parameter, the first text data, and the second text data.

6. The system of claim 5, wherein based on the weight parameter, the diffusion model determines:

a first probability of inclusion of first characteristics associated with the first text data in the third image data; and a second probability of inclusion of second characteristics associated with the second text data in the third image data.

7. The system of claim 6, wherein the weight parameter ($\lambda$) associated with the first text data ($c_s$) and the second text data ($c_t$) is used to determine the third image data based on the equation:

$$\lambda c_t + (1-\lambda)c_s.$$

8. The system of claim 1, wherein the first content includes a background depicted in the first image data, the second content includes an object described by the second text data, and the third image data represents an image that depicts the object within the background.

9. A system comprising:

one or more non-transitory memories storing computer-executable instructions; and one or more hardware processors to execute the computer-executable instructions to:

determine first data associated with first content;

determine second data associated with second content;

provide the first data and the second data as inputs to a diffusion model that is trained to generate image data based on data associated with content;

determine, using the diffusion model, first image data based on the first data and noise data;

determine, using the diffusion model, a weight parameter associated with one or more of the first data or the second data;

determine third data based on the weight parameter, the first data, and the second data, and determine, using the diffusion model, second image data based on the first image data, the third data, and a parameter indicative of dependence between the first data and the second data.

10. The system of claim 9, further comprising computer-executable instructions to:

receive user input comprising an image;

determine one or more characteristics of the image; and determine the first data based on the one or more characteristics.

11. The system of claim 9, further comprising computer-executable instructions to:

receive user input comprising the first data, the second data, and an image, wherein the first data comprises text associated with the image and the second data comprises text associated with an object that is not included in the image.

12. The system of claim 9, wherein the third data comprises text data, and wherein the diffusion model determines the second image data based at least in part on the text data.

13. The system of claim 9, wherein the computer-executable instructions to determine the weight parameter include computer-executable instructions to, using the diffusion model:

determine an initial value for the weight parameter;

determine third image data based on the initial value, the first data, and the second data;

determine a loss value based on the third image data and the first data; and modify the initial value based on the loss value to determine the weight parameter.

14. The system of claim 9, wherein the first content includes a first image that depicts a background, the second content includes text that describes an object, and the second image data represents a second image that depicts the object within the background.

15. The system of claim 9, wherein based on the weight parameter, the diffusion model determines:

a first probability of inclusion of first characteristics associated with the first data in the second image data; and a second probability of inclusion of second characteristics associated with the second data in the second image data.

16. The system of claim 15, wherein the weight parameter ($\lambda$) associated with the first data ($c_s$) and the second data ($c_t$) is used to determine the second image data based on the equation:

$$\lambda c_t + (1-\lambda)c_s.$$

17. A system comprising:

one or more non-transitory memories storing computer-executable instructions; and one or more hardware processors to execute the computer-executable instructions to:

determine first data associated with first content;

determine second data associated with second content;

provide the first data and the second data as inputs to a machine learning model that is trained to generate image data based on data associated with content;

determine, using the machine learning model, first image data based on the first data and noise data;

determine, using the machine learning model, a weight parameter associated with one or more of the first data or the second data; and determine, using the machine learning model, second image data based on the first image data, the weight parameter, the first data, the second data, and a parameter indicative of dependence between the first data and the second data, wherein based on the weight parameter, the machine learning model determines:

a first probability of inclusion of a first characteristic associated with the first data in the second image data; and a second probability of inclusion of a second characteristic associated with the second data in the second image data.

18. The system of claim 17, further comprising computer-executable instructions to determine the weight parameter by:

determining an initial value for the weight parameter;

determining third image data based on the initial value, the first data, and the second data;

determining a loss value based on the third image data and the first data; and modifying the initial value based on the loss value to determine the weight parameter.

19. The system of claim 17, further comprising computer-executable instructions to:

determine third data based on the weight parameter, the first data, and the second data, wherein the third data is used as a single input to the diffusion model.

20. The system of claim 17, further comprising computer-executable instructions to:

receive user input comprising an image;

determine one or more characteristics of the image; and determine the first data based on the one or more characteristics.

\* \* \* \* \*